United States Patent
Baier-Welt et al.

(10) Patent No.: US 6,851,525 B2
(45) Date of Patent: Feb. 8, 2005

(54) ELECTRIC-MOTOR DRIVEN PARKING BRAKE, PARTICULARLY FOR A MOTOR VEHICLE

(75) Inventors: Christian Baier-Welt, Rimpar (DE); Stephan Roos, Wertheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/621,895

(22) Filed: Jul. 17, 2003

(65) Prior Publication Data

US 2004/0026195 A1 Feb. 12, 2004

Related U.S. Application Data

(63) Continuation of application No. PCT/DE01/02210, filed on Jun. 13, 2001.

(30) Foreign Application Priority Data

Jan. 25, 2001 (DE) .......................................... 101 03 295

(51) Int. Cl.[7] .............................................. F16D 65/36
(52) U.S. Cl. ........................................ 188/156; 188/162
(58) Field of Search ............................... 188/265, 72.8, 188/2 D, 171, 156, 162

(56) References Cited

U.S. PATENT DOCUMENTS

| | | | | |
|---|---|---|---|---|
| 4,281,736 A | * | 8/1981 | Lizzio | 180/271 |
| 4,561,527 A | * | 12/1985 | Nakamoto et al. | 192/219.4 |
| 4,582,177 A | * | 4/1986 | Carre et al. | 188/72.8 |
| 4,817,463 A | * | 4/1989 | Cameron | 475/154 |
| 5,004,077 A | * | 4/1991 | Carlson et al. | 188/2 D |
| 5,180,038 A | * | 1/1993 | Arnold et al. | 188/171 |
| 5,251,968 A | * | 10/1993 | Rath | 303/9.62 |
| 5,542,513 A | * | 8/1996 | Reyes | 192/219.4 |
| 5,590,744 A | * | 1/1997 | Belmond | 188/265 |
| 6,244,394 B1 | * | 6/2001 | Gutierrez et al. | 188/72.8 |
| 6,279,692 B1 | * | 8/2001 | Siepker et al. | 188/105 |
| 6,446,768 B2 | * | 9/2002 | Kikuta et al. | 188/162 |
| 6,457,783 B1 | * | 10/2002 | Schanzenbach et al. | 303/115.2 |
| 6,655,506 B2 | * | 12/2003 | Pfeil et al. | 188/156 |
| 6,662,909 B2 | * | 12/2003 | Taniguchi | 188/162 |

FOREIGN PATENT DOCUMENTS

| | | | | |
|---|---|---|---|---|
| DE | | 3423510 A1 | 1/1986 | F16D/65/34 |
| DE | | 41 38 625 A1 | 5/1993 | H02K/7/116 |
| WO | WO 90/15743 | | 12/1990 | B60T/7/08 |

* cited by examiner

Primary Examiner—Pam Rodriguez
(74) Attorney, Agent, or Firm—Baker Botts L.L.P.

(57) ABSTRACT

A parking brake is disclosed, comprising a brake-actuating electric motor (1), a brake actuating output shaft (2) driven by said electric motor and extending along a second axis (A2), a brake-actuating linkage (4) that is adjustably arranged parallel to a first axis (A1) that substantially extends perpendicularly to the second axis (A2), and a drive connection from the brake-actuating output shaft (2) to the brake-actuating linkage (4). The drive connection is configured in the form of a cam-type cam disk or gate guide (3) that translates the rotation of the brake-actuating output shaft (2) into a translational movement of the brake-actuating linkage (4) through an adjusting element (5) that is guided along a surface (F) of the cam disk or gate guide 93) forming a radial profile. The motor axis (A3) of the brake-actuating electric motor (1) extends substantially perpendicular to the second axis (A2).

20 Claims, 6 Drawing Sheets

US 6,851,525 B2

ELECTRIC-MOTOR DRIVEN PARKING BRAKE, PARTICULARLY FOR A MOTOR VEHICLE

CROSS REFERENCE TO RELATED APPLICATION

This application is a continuation of copending International Application No. PCT/DE01/02210 filed Jun. 13, 2001, which designates the United States, and claims priority to German application number 10103295.1 filed Jan. 25, 2001.

TECHNICAL FIELD OF THE INVENTION

The invention relates to an electric-motor driven parking brake, particularly for a motor vehicle.

BACKGROUND OF THE INVENTION

Electric-motor driven parking brakes in motor vehicles are intended to replace the mechanical handbrake lever, actuated by muscle power. For this purpose, the electric-motor driven parking brake must be capable of building up the required brake actuation force in the brake cable within a very short time using the current available from the vehicle electrical system, while having the most compact dimensions possible. In addition, suitable measures must be provided to ensure that, after the brake has been pulled on and the motor switched off, the brake cannot be released as a result of an unintended backward movement of the brake cable.

Known electric-motor driven parking brakes have an electric motor which drives a spindle gearbox. The spindle gearbox converts the rotary movement of the electric motor into a translational movement of the spindle. The translational movement of the spindle is transmitted to a brake-actuating linkage, which is permanently connected to the brake cable. To avoid any unintended backward movement of the brake cable after the motor is switched off, the spindle gearbox is designed to be self-locking. This self-locking property is achieved by the thread on the spindle having a low pitch. However, a consequence of this is that the parking brake has a low efficiency because such a spindle drive has high frictional losses and, depending on its arrangement, a gearbox which is subject to further losses must generally be inserted between the motor and the spindle. Furthermore, such parking brakes have a large unit volume, because a larger motor is required due to the low efficiency. A further disadvantage consists in the fact that the large motor means that the current required cannot always be supplied by the vehicle's electrical system.

SUMMARY OF THE INVENTION

The underlying object of the invention is to specify an electric-motor driven parking brake which has a particularly small unit volume and a particularly high level of efficiency.

This object can be achieved by an electric-motor driven parking brake in particular for a vehicle, comprising an electric brake-actuating motor having a first drive axis, a brake-actuating output shaft which extends along a second axis which is substantially perpendicular to the first axis and is driven by the electric brake-actuating motor, a brake-actuating linkage which is arranged so that it can move along a line parallel to the first axis, and a drive linkage from the brake-actuating output shaft to the brake-actuating linkage which translates a rotational movement around the second axis into a longitudinal movement parallel to the first drive axis.

The parking brake may further comprise a cam disk or gate guide which is cam-like in the sense that it converts a rotation of the brake-actuating output shaft into a translational movement of the brake-actuating linkage by means of an actuation element which is guided along a surface of the cam disk or gate guide, wherein the surface of the cam disk or gate guide forms a height profile in a radial direction, and wherein the orientation of the motor axis of the electric brake-actuating motor is essentially perpendicular to the second axis.

The object can also be achieved by an electric-motor driven parking brake in particular for a vehicle, comprising an electric brake-actuating motor, in particular a commutator motor, a brake-actuating output shaft which extends along a second axis and is driven by the electric brake-actuating motor, a brake-actuating linkage which is arranged so that it can move parallel to a first axis which is essentially perpendicular to the second axis, a drive linkage from the brake-actuating output shaft to the brake-actuating linkage in the form of a cam disk or gate guide which is cam-like in the sense that it converts a rotation of the brake-actuating output shaft into a translational movement of the brake-actuating linkage by means of an actuation element which is guided along a surface of the cam disk or gate guide, wherein the surface of the cam disk or gate guide forms a height profile in a radial direction, and wherein the orientation of the motor axis of the electric brake-actuating motor is essentially perpendicular to the second axis.

The embodiments may further comprise a worm drive in the drive train between the electric brake-actuating motor and the brake-actuating output shaft. The cam disk or gate guide may be shaped with the intention that an essentially constant load is exerted on the electric brake-actuating motor over essentially the entire brake-actuation cycle. At least one rest position in the surface of the cam disk or gate guide may be provided with the intention of effecting a fixed positioning, which is self-locking with respect to restorative forces, of the actuation element. The rest position can be located at the position on the surface of the cam disk or gate guide at which the actuation element is located when the parking brake is pulled on with essentially nominal force. At least one further rest position may be arranged in the surface of the cam disk or gate guide. A gearbox, which links the brake-actuating output shaft to the motor shaft, can be of self-locking construction. An additional leverage conversion between the actuation element and the brake-actuating linkage may be provided. The rest position may take the form of a depression in the surface of the cam disk or gate guide. The motor axis may run parallel to the first axis.

In order to actuate the parking brake, the electric motor is activated. The rotor of the electric motor then turns in the sense which will cause the vehicle's brake linings to be pressed home (braking sense). This rotational movement in the braking sense is transmitted via the brake-actuating output shaft to the cam disk or gate guide. This causes the actuation element, which is arranged so that it can move along a first axis, to move along the surface of the cam disk or gate guide, as applicable. The surface of the cam disk or gate guide, as applicable, is constructed in such a way that the actuation element effects a translational movement. The brake-actuating linkage, which like the actuation element is arranged so that it can move along the first axis, thereupon also effects a translational movement.

The drive links, consisting of such a cam disk or gate guide, as applicable, and such an actuation element, exhibit very low frictional losses, so that the parking brake has a high level of efficiency.

The brake-actuating linkage is arranged to be essentially perpendicular to the brake-actuating output shaft. That is to say that the first axis is essentially perpendicular to the second axis.

As a rule, the motor will have its largest dimension along the motor axis. Because both the motor shaft of the electric brake-actuating motor and also the brake-actuating linkage are essentially perpendicular to the second axis, the parking brake has particularly small dimensions along the second axis. The motor and the brake-actuating linkage are thus arranged to be close beside each other. Consequently, the parking brake is particularly compact.

The parking brake has only a small unit height, because of the parallel axes arrangement.

The parking brake is particularly compact if the axis of the motor runs approximately parallel to the first axis, because the parking brake also has particularly small dimensions in the direction perpendicular to the first and second axes.

The brake-actuating output shaft could for example be connected to the motor shaft by a worm drive. This would enable a small, low-cost motor to achieve large torques on the output shaft, and consequently high actuation forces on the brake cables.

The cam disk or gate guide, as applicable, takes a cam-like form. The surface, along which the actuation element is guided, represents the perimeter of the cam disk or gate guide. The cam disk or gate guide thus exhibits a radial height profile.

A radial cam disk or gate guide is particularly easy and cost-effective to manufacture, because from a production technology point of view the cam disk or gate guide is two-dimensional.

A parking brake with a radial cam disk or gate guide has the additional advantage that the actuation element loads the cam disk or gate guide in a radial direction instead of, for example, axially, with the result that the bearing forces are significantly more favorable, whereby the service life of the parking brake is increased.

Because the slope of the surface along which the actuation element is guided, together with the force which the brake linkage exerts on the actuation element, determines the minimum required torque from the electric motor, the surface can be designed in such a way, by variations in the slope of its profile, that the electric motor is essentially subject to a load which is roughly constant throughout the brake actuation cycle, even though the brake positioning forces for the brake-actuating linkage vary greatly over the brake actuation cycle.

The following relationship applies between the force $F_B$ on the brake-actuating linkage and the moment M on the brake-actuating output shaft:

$$M = F_B * dH/d\alpha$$

where H=height of the curve, measured from the center point of the cam disk or gate guide and $\alpha$=the angular rotation in radians The shape of the cam disk or gate guide is thus arranged in such a way that, even though the actuation force on the brake-actuating linkage generally increases over the brake actuation cycle, the actuation force results in an essentially constant torque at the brake-actuating output shaft, and consequently a constant load on the motor. This makes it possible for the electric motor always to operate at its most favorable operating point for producing a particular torque, so that the electric motor can be designed, in terms of its unit size and its power requirement from the battery, so as to represent a minimum load. This leads to a particularly high efficiency for the parking brake and good motor utilization. For an electric motor with a prescribed maximum power, the measures described reduce the braking time to a minimum, because for a limited force on the actuation element, that is to say for a limited brake positioning force, the power of the electric motor is nevertheless used optimally, in that a particularly fast translational movement of the brake-actuating linkage is carried out. In practice, this means essentially that at the start of the brake actuation cycle the free play and other mechanical tolerances are overcome by the provision of a steep slope on the surface, that is a smaller mechanical advantage, and in the range where the actuation forces to press home the brake linings are high the surface has a smaller slope, that is to say there is a larger mechanical advantage between the brake-actuating output shaft and the brake-actuating linkage.

The use of a cam disk or gate guide thus permits variable mechanical advantage between the rotational and translational movements over the brake actuation cycle, adjusted for the brake actuation load.

The gearbox which links the brake-actuating output shaft to the motor shaft can, for example, be in self-locking form, so as to avoid unintended backward movement of the brake-actuating linkage when the motor is de-energized.

The self-locking property of the parking brake could alternatively, for example, be realized by a rest position in the surface of the cam disk or gate guide, representing a fixed position of the actuation element which is self-locking with respect to the restoring forces.

The rest position might for example be a depression in the surface of the cam disk or gate guide, in the center of which the slope of the surface is zero. When the electric motor is switched off, the pressure of the actuation element, produced by the brake-actuating linkage, on the surface of the cam disk or gate guide at a point outside the rest position has the effect that the cam disk or gate guide rotates in the opposite of the braking sense, because of the slope of its surface, until the actuation element engages in the rest position. The depression is arranged in such a way that the actuation element cannot by itself slip out of the rest position as a result of vibrations. The rest position represents a local point of minimum energy. When the actuation element is in the rest position, the pressure from the actuation element on the cam disk or gate guide does not produce a restoring moment on the gearbox and motor. The actuation element is thus firmly positioned in the rest position. Only the action of the electric motor, either in the braking sense or in the opposite sense from a braking rotation, can release the actuation element from the rest position.

Preferably, the rest position will be located at the point on the surface of the cam disk or gate guide at which the actuation element is positioned when the parking brake is essentially pulled on with the nominal force.

It is advantageous if a further rest position is arranged behind the rest position, so that short term elongations in the cable and brake system, particularly thermal play, can be compensated and so that the full nominal force can be achieved.

The invention also covers the provision of further rest positions along the surface of the cam disk or gate guide.

The brake-actuating linkage can, for example, run parallel to the floor of the vehicle.

Preferably, an additional leverage will be introduced between the actuation element and the brake-actuating linkage, so that the cam disk or gate guide can make a longer cable movement or achieve greater cable forces.

BRIEF DESCRIPTION OF THE DRAWINGS

Exemplary embodiments of the invention are explained in more detail below, by reference to the figures.

DETAILED DESCRIPTION OF THE PREFERRED EMBODIMENTS

Figure 1:
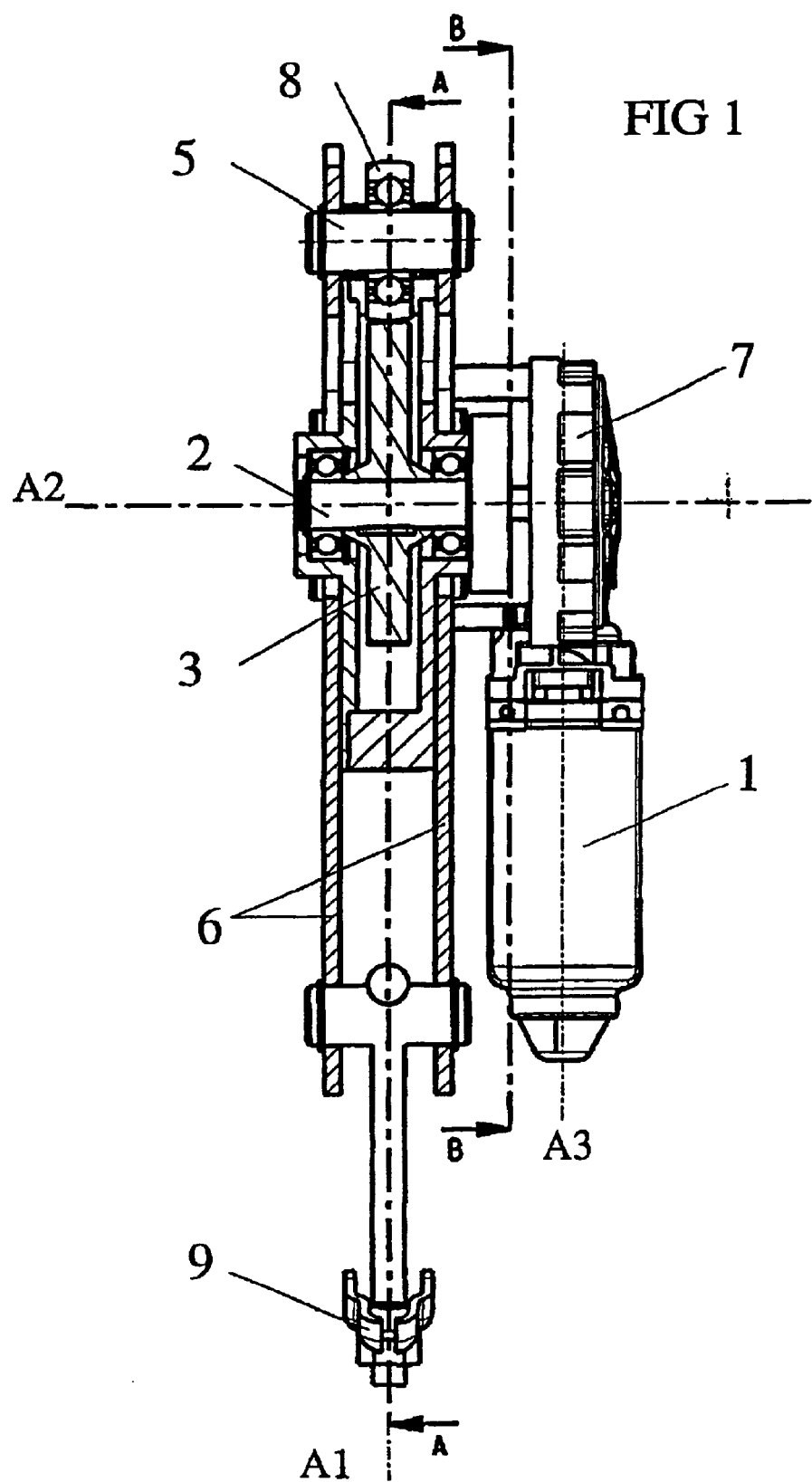
FIG. 1 shows a cross-sectional view of the construction of an electric-motor driven parking brake.
Figure 2:
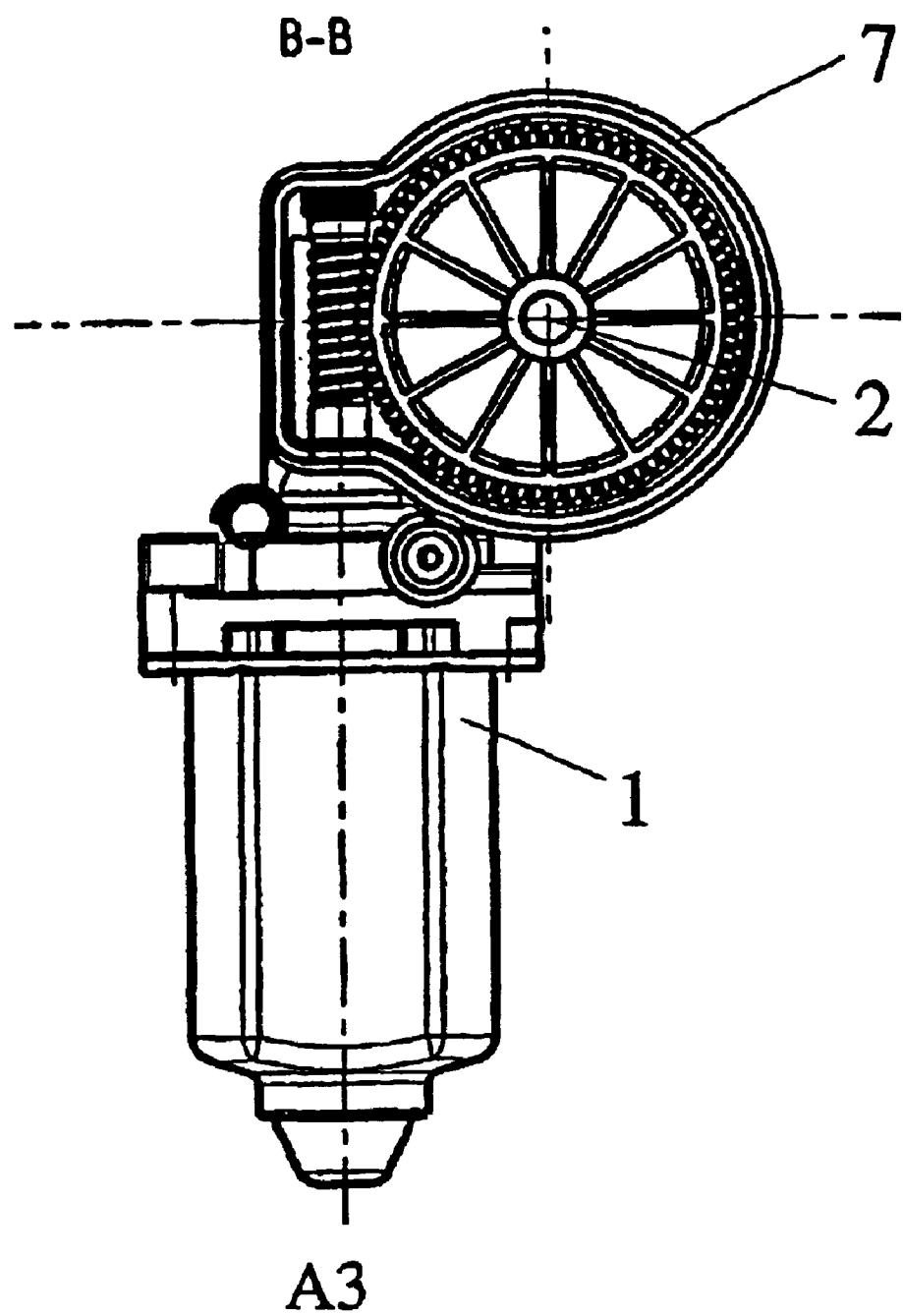
FIG. 2 shows a view of a worm drive used for the parking brake.

In an exemplary embodiment, a parking brake has an electric brake actuation motor 1, in particular a commutator motor. Via a worm drive 7, the electric motor 1 drives a brake-actuating output shaft 2 which runs perpendicularly to the motor axis A3, and hence to the motor shaft (see FIGS. 1 and 2). The brake-actuating output shaft 2 runs along a second axis A2.

Figure 3:
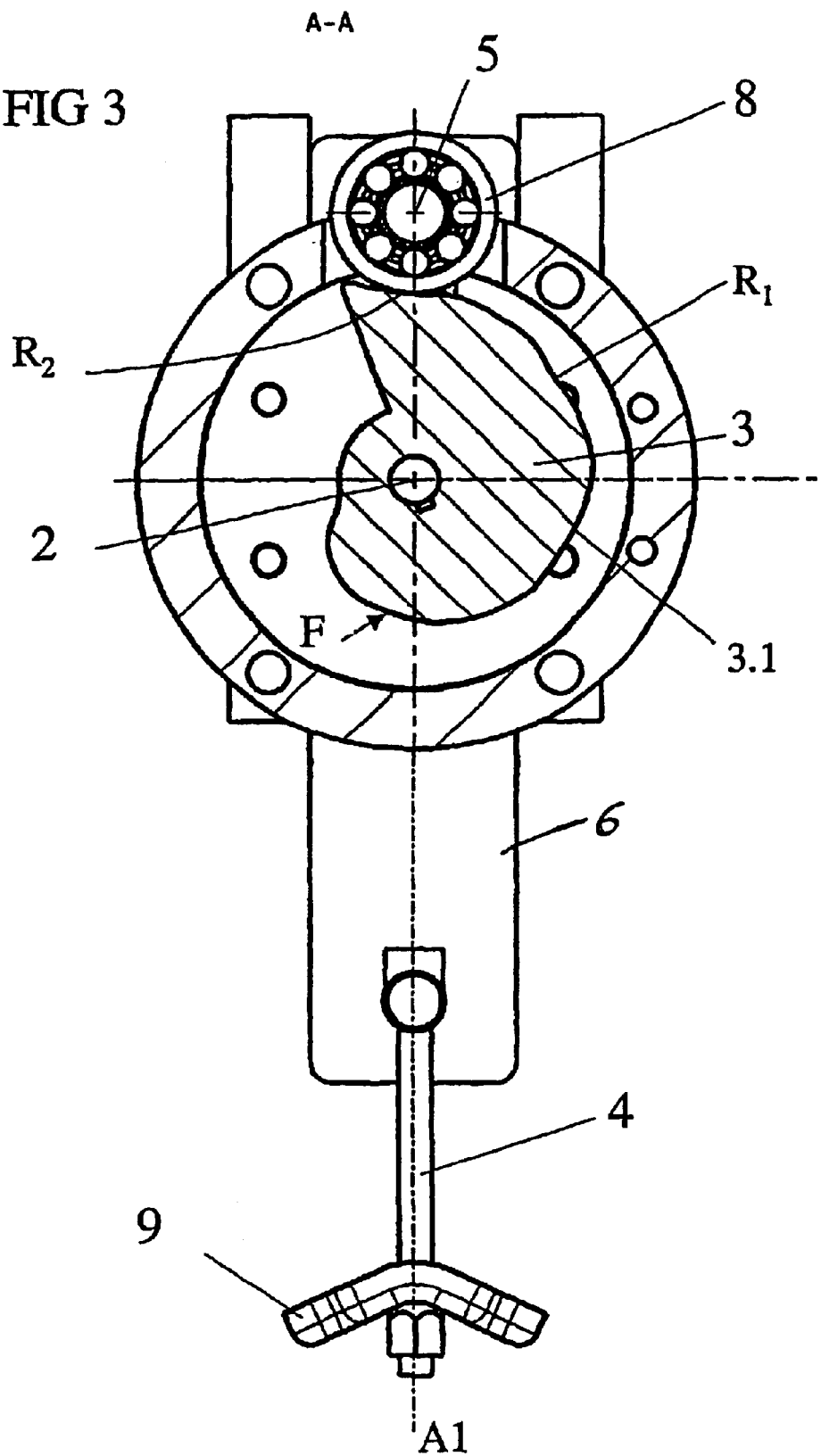
FIG. 3 shows a section through the parking brake, in which the mutual positions of the cam disk or gate guide and the actuation element are shown at the end of a brake actuation cycle.

A radial cam disk or gate guide 3 is mounted so that it is concentric with the brake-actuating output shaft 2, and has a height profile 3.1 in the radial direction, which defines a surface F around the perimeter of the cam disk or gate guide 3 (see FIG. 3).

A crossbeam-type axial actuation element 5 with a roller 8 is arranged so that it can move along a first axis A1, which is oriented perpendicularly to the second axis A2 and parallel to the motor axis A3. The roller 8 rests on the surface F. When the cam disk or gate guide 3 is rotated, the roller 8 is guided along the surface F, causing the actuation element 5 to execute a translational movement (see FIG. 3), along the first axis A1, which corresponds to the graph of the radial height profile 3.1 (lift height H as a function of the rotation angle α). A maximum angle of rotation of approx. 360° is provided for by the cam disk or gate guide 3 which is rotated by the brake-actuating output shaft 2.

The surface F has two rest positions R1, R2 in the form of depressions.

Figure 4:
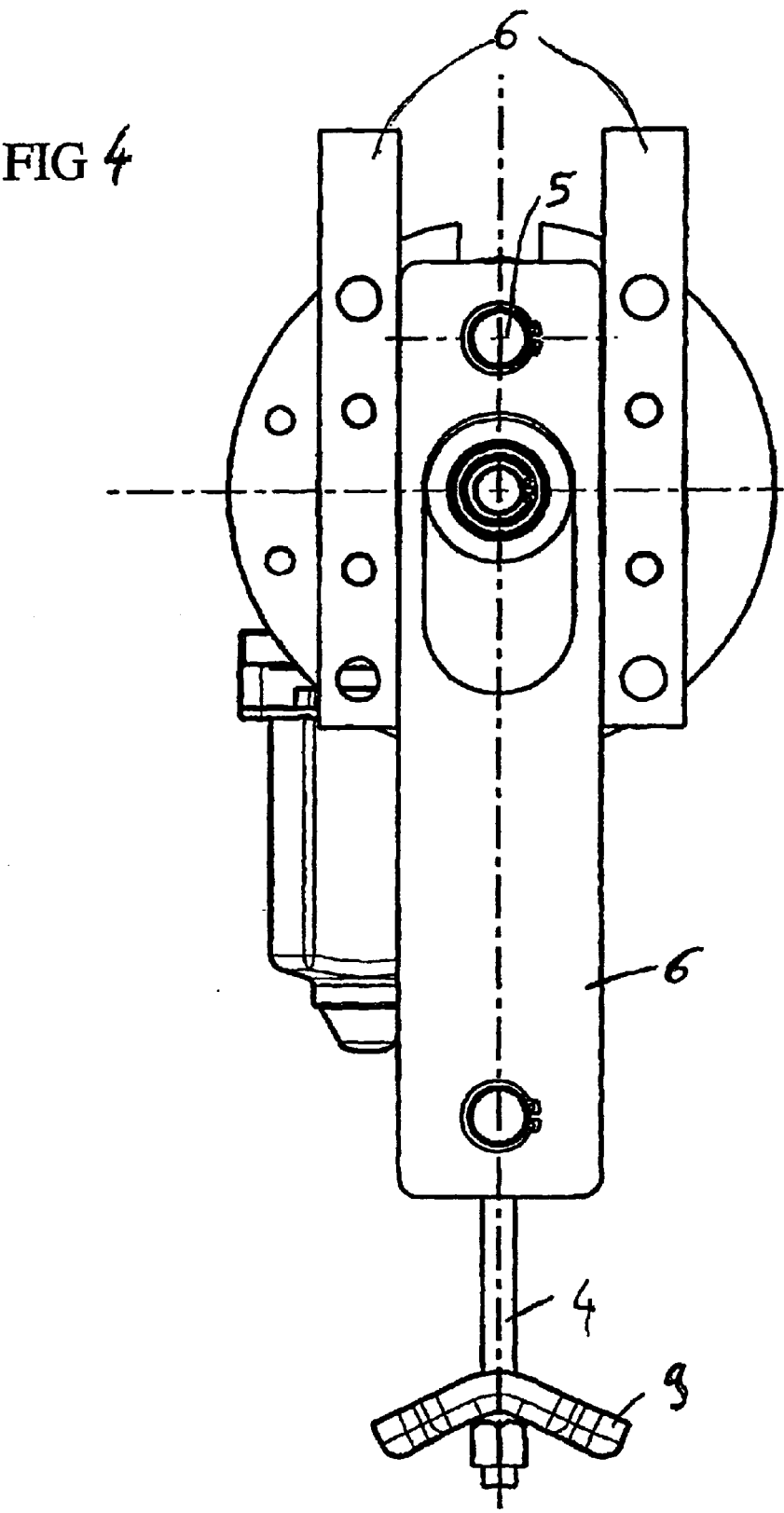
FIG. 4 is a side view corresponding to FIG. 1, in which a linear guide for a brake-actuating linkage is shown at the start of a brake actuation cycle.

The actuating element 5 is connected via a linear guide 6 (FIGS. 3 and 4), which takes the form of a slot-guided drawbar, and a brake-actuating linkage 4 to a cable balancer 9, which is arranged to be concentric with the first axis A1 (see FIG. 4).

Figure 5:
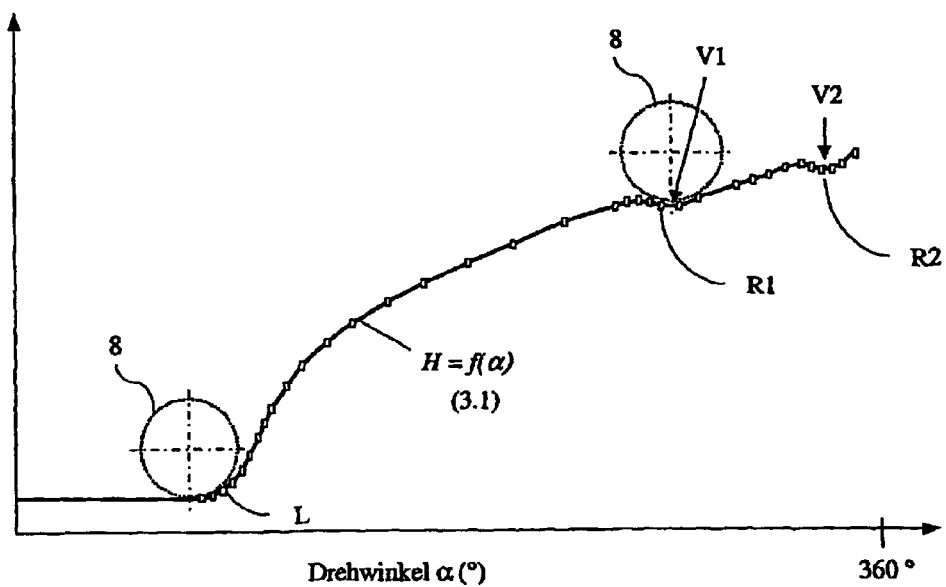
FIG. 5 shows a graph of the height profile of the cam disk or gate guide against its angle of rotation, and the positions of the actuation element or its end rollers, as appropriate, corresponding to the two positions shown in FIG. 3 and FIG. 4.

A specific height profile H=f(α) for the actuation of a parking brake is shown in FIG. 5. The height profile, which is reproduced in the shape of the surface F of the cam disk or gate guide 3, along which the actuation element 5 is moved, exhibits two rest positions R1, R2. The first rest position R1 is located at α=approx. 320°, at the point on the surface F of the cam disk or gate guide 3 at which the actuation element 5 is located when the parking brake is pulled on with essentially nominal force. The second rest position R2 is located behind the first rest position R1.

FIG. 5 shows in addition two examples of positions of the free end of the roller 8 which guides the actuation element 5, between a released position L (α=40°) on the left and on the right a brake-actuating position. In the brake actuating position on the right, the actuating element 5 is located in a first rest position R1. In both rest positions R1, R2 the roller 8, and hence the free end of the actuation element 5, can in accordance with one embodiment of the invention be held against a possible restorative force, produced by the system, by a form of self-locking which can be cancelled by the electric brake-actuation motor 1 when it is activated, in that depressions V1, V2 are provided in the graph of H=f(α) for the axial height profile 3.1 of the cam disk or gate guide 3, into which the roller 8 sinks and can thus be held. The released position L on the left also represents a type of depression, in which the actuation element 5 will remain if the electric motor 1 is not activated.

Figure 6:
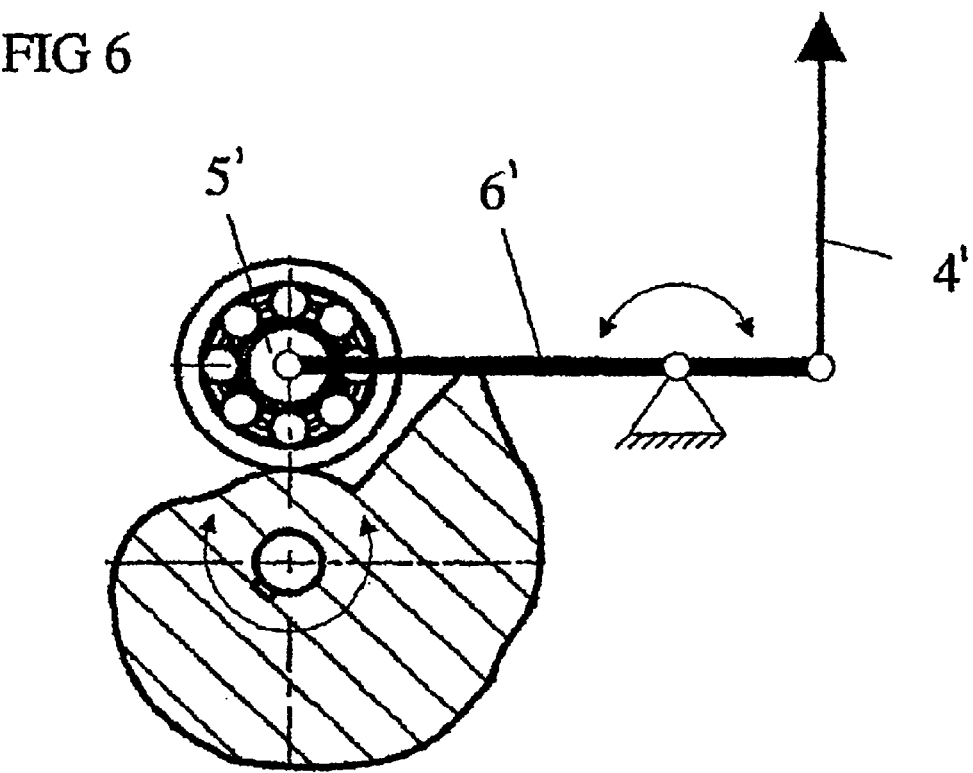
FIG. 6 shows in schematic form a leverage mechanism for another parking brake.

FIG. 6 shows the actuation element 5', the cam disk or gate guide 3' and the brake-actuating linkage 4' of a further parking brake, showing in schematic form the insertion of a leverage mechanism 6' between the actuation element and the brake-actuating linkage 4'.

What is claimed is:

1. Electric-motor driven parking brake in particular for a vehicle, comprising:
    an electric brake-actuating motor, in the form of a commutator motor,
    a brake-actuating output shaft which extends along a second axis and is driven by the electric brake-actuating motor,
    a brake-actuating linkage which is arranged so that it can move parallel to a first axis which is essentially perpendicular to the second axis,
    a drive linkage from the brake-actuating output shaft to the brake-actuating linkage in the form of a cam disk or gate guide converts a rotation of the brake-actuating output shaft into a translational movement of the brake-actuating linkage by means of an actuation element which is guided along a surface of the cam disk or gate guide,
    wherein the surface of the cam disk or gate guide forms a height profile in a radial direction, and
    the orientation of the motor axis of the electric brake-actuating motor is essentially perpendicular to the second axis.

2. Parking brake in accordance with claim 1, further comprising:
    a worm drive in the drive train between the electric brake-actuating motor and the brake-actuating output shaft.

3. Parking brake in accordance with claim 1, wherein
    the cam disk or gate guide being shaped such that an essentially constant load is exerted on the electric brake-actuating motor over essentially the entire brake-actuation cycle.

4. Parking brake in accordance with claim 1, further comprising
    at least one rest position in the surface of the cam disk or gate guide effecting a fixed position, which is self-locking with respect to restorative forces, of the actuation element.

5. Parking brake in accordance with claim 4, wherein
    the rest position is located at the position on the surface of the cam disk or gate guide at which the actuation element is located when the parking brake is pulled on with essentially nominal force.

6. Parking brake in accordance with claim 4, wherein at least one further rest position is arranged in the surface of the cam disk or gate guide.

7. Parking brake in accordance with claim 4, wherein the rest position takes the form of a depression in the surface of the cam disk or gate guide.

8. Parking brake in accordance with claim 1, wherein a gearbox, which links the brake-actuating output shaft to the motor shaft, is of self-locking construction.

9. Parking brake in accordance with claim 1, further comprising
a leverage mechanism between the actuation element and the brake-actuating linkage.

10. Parking brake in accordance with claim 1, wherein the motor axis runs parallel to the first axis.

11. Electric-motor driven parking brake in particular for a vehicle, comprising:
an electric brake-actuating motor having a first drive axis,
a brake-actuating output shaft which extends along a second axis which is substantially perpendicular to the first axis and is driven by the electric brake-actuating motor,
a brake-actuating linkage which is arranged so that it can move along a line parallel to the first axis,
a drive linkage from the brake-actuating output shaft to the brake-actuating linkage which translates a rotational movement around the second axis into a longitudinal movement parallel to the first drive axis by means of an actuating element that is guided along the first drive axis.

12. Parking brake in accordance with claim 11, further comprising a cam disk or gate guide to convert a rotation of the brake-actuating output shaft into a translational movement of the brake-actuating linkage by means of the actuation element which is guided along a surface of the cam disk or gate guide,
wherein the surface of the cam disk or gate guide forms a height profile in a radial direction, and the orientation of the motor axis of the electric brake-actuating motor is essentially perpendicular to the second axis.

13. Parking brake in accordance with claim 12, wherein the cam disk or gate guide being shaped in such a way that an essentially constant load is exerted on the electric brake-actuating motor over essentially the entire brake-actuation cycle.

14. Parking brake in accordance with claim 12, further comprising
at least one rest position in the surface of the cam disk or gate guide for effecting a fixed positioning, which is self-locking with respect to restorative forces, of the actuation element.

15. Parking brake in accordance with claim 14, wherein the rest position is located at the position on the surface of the cam disk or gate guide at which the actuation element is located when the parking brake is pulled on with essentially nominal force.

16. Parking brake in accordance with claim 14, wherein at least one further rest position is arranged in the surface of the cam disk or gate guide.

17. Parking brake in accordance with claim 14, wherein the rest position takes the form of a depression in the surface of the cam disk or gate guide.

18. Parking brake in accordance with claim 11, further comprising:
a worm drive in the drive train between the electric brake-actuating motor and the brake-actuating output shaft.

19. Parking brake in accordance with claim 11, wherein a gearbox, which links the brake-actuating output shaft to the motor shaft, is of self-locking construction.

20. Parking brake in accordance with claim 11, further comprising
a leverage mechanism between the actuation element and the brake-actuating linkage.

* * * * *